Nov. 23, 1971     F. C. BUGNELL     3,621,509

VEHICLE BODY CLOSURE COUNTERBALANCE

Filed Aug. 18, 1969     4 Sheets-Sheet 1

INVENTOR.
Felix C. Bugnell
BY
Herbert Furman
ATTORNEY

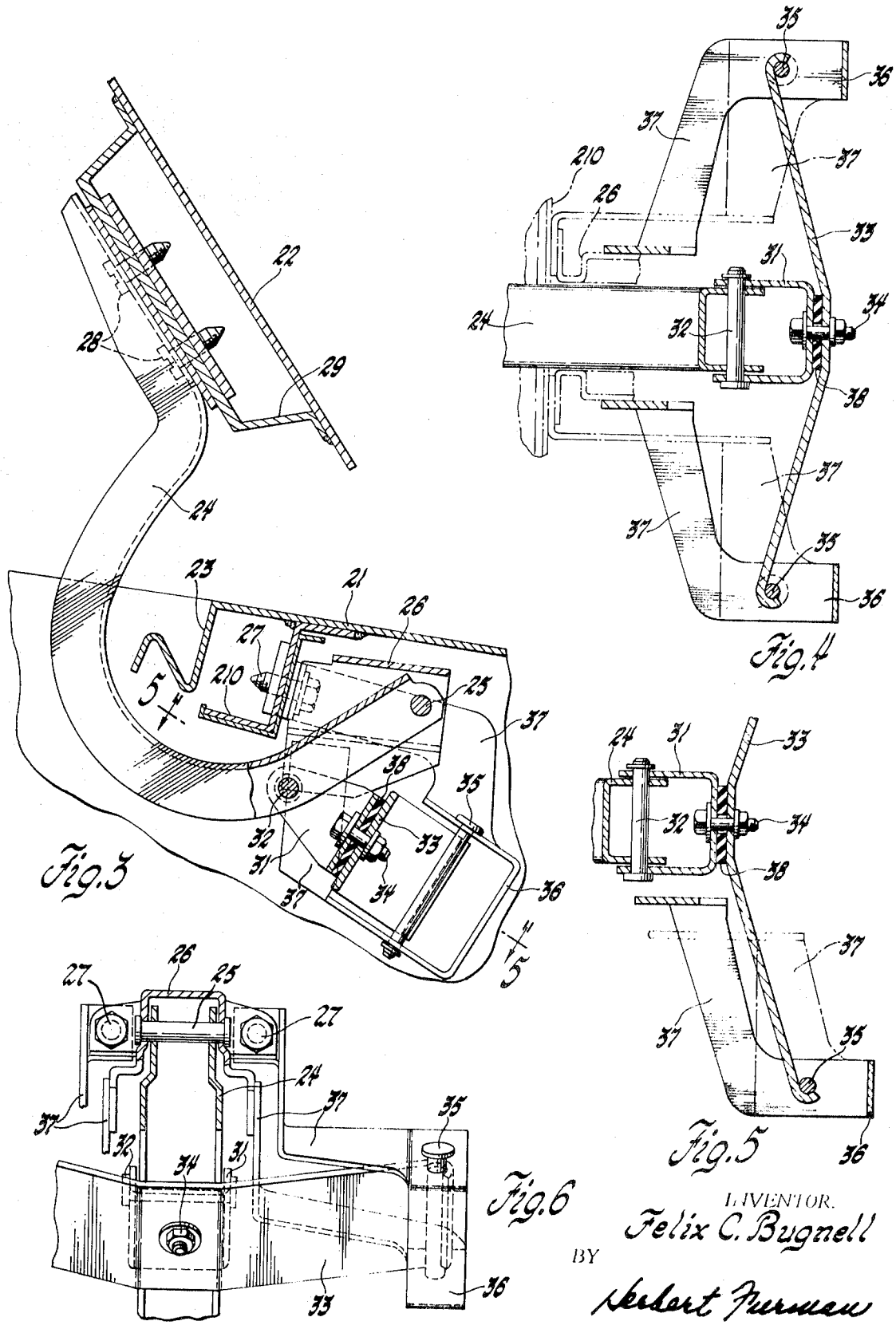

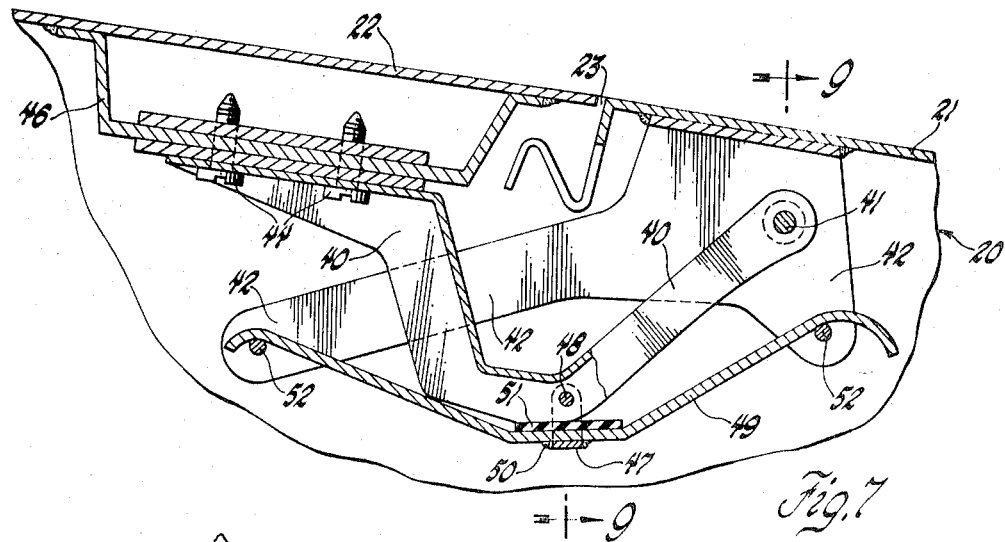
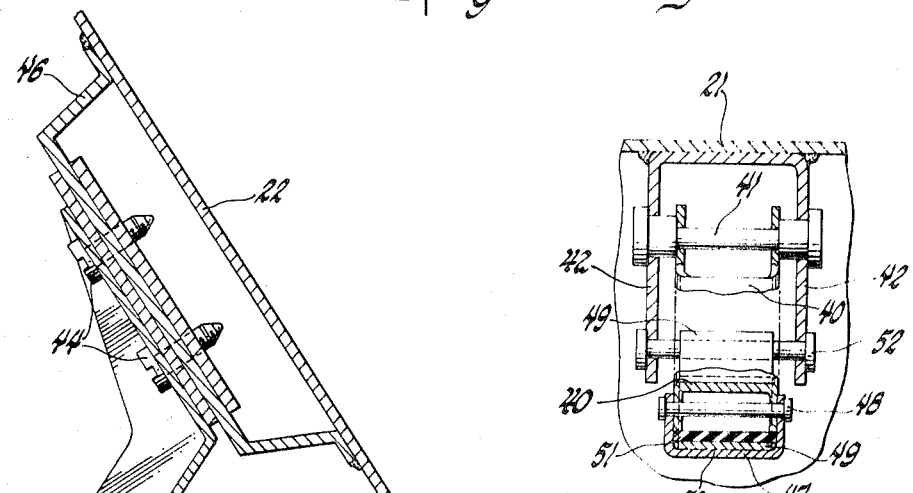
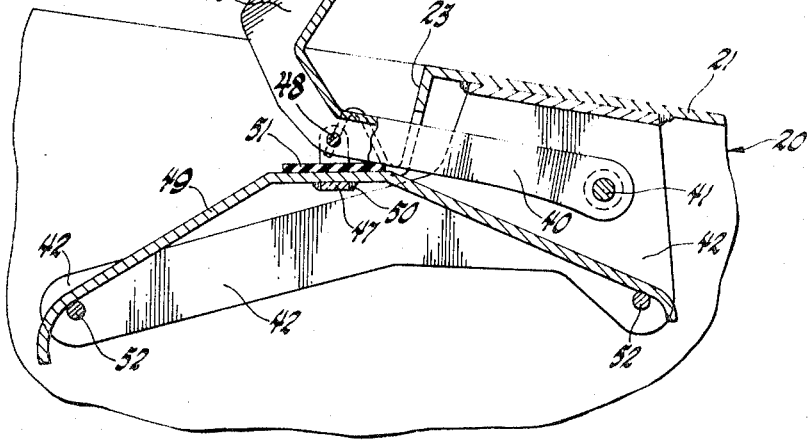

United States Patent Office 3,621,509
Patented Nov. 23, 1971

3,621,509
VEHICLE BODY CLOSURE COUNTERBALANCE
Felix C. Bugnell, Livonia, Mich., assignor to General Motors Corporation, Detroit, Mich.
Filed Aug. 18, 1969, Ser. No. 850,900
Int. Cl. E05d *15/58;* E05f *1/12*
U.S. Cl. 16—85   5 Claims

ABSTRACT OF THE DISCLOSURE

A leaf spring is pivoted intermediate its ends to a hinge arm which swingably mounts a vehicle closure on a vehicle body. The ends of the spring slidably bear on fixed pins mounted on the body. The leaf spring is in a free position when the closure is in open position and is flexed opposite to its free position when the closure is closed to provide an opening spring counterbalance force. The leaf spring may be located parallel with the hinge arm or transverse of the hinge arm. In another embodiment, the leaf spring has one end fixed to the closure and the intermediate portion and the other end thereof respectively slidably bearing on one lobe of an adjustable multilobed cam and an abutment on the body.

---

This invention relates to vehicle body hinges and more particularly to a counterbalance for a vehicle body closure.

Conventionally, vehicle body closures are counterbalanced by various types of springs, such as torque rods, tension springs, and compression springs. Often the space necessary for the spring counterbalance is greater than that available and space limitations are therefore important in certain body styles.

The counterbalance of this invention is contained within the confines of the hinge and its supporting bracket structure on the body so that very little space is required but yet an effective counterbalancing spring force is available to bias the closure to its open position.

In the preferred embodiment of the invention, a bowed leaf spring is centrally secured to the hinge arm and the ends of the leaf spring bear on fixed abutments on the bracket structure which supports the hinge arm on the body. The leaf spring is in a generally free position when the closure is in open position and is bowed oppositely of its free position when the closure is moved to closed position to provide a spring counterbalance force. The spring may be located transverse of the hinge arm and fixed thereto or may be located generally parallel to the hinge arm and pivoted thereto. Additionally, the leaf spring and its cooperating structure can be preassembled with the hinge arm and its supporting structure to provide a unitary assembly which can be then installed as a unit on the body. This is very desirable in many installations where access may be difficult and, of course, saves assembly time.

In another embodiment, a bowed leaf spring is fixed at one end thereof to the closure and has the intermediate portion thereof slidably bearing on a multilobed adjustable cam and the other end portion thereof slidably bearing on the bracket structure. The cam lobe provides a fulcrum about which the bowed spring is bent as the closure moves to closed position and the amount of counterbalance force can be adjusted by locating various ones of the lobes of the cam in engagement with the spring.

The primary feature of this invention is to provide an improved counterbalance for a hinged vehicle body closure which includes a leaf spring secured at one portion to one of a pair of relatively swingable members and having other spaced portions thereof slidably bearing on the other member, with the one portion being displaced relative to the other portions to flex the spring and provide a spring counterbalance force biasing the members relative to each other to open position. Another feature of this invention is that the leaf spring can either be fixedly or pivotally secured to the one member and be located in various attitudes relative to the one member. A further feature of this invention is that the central portion of the leaf spring is secured to the one member and is displaced to an opposite side of the free ends of the spring slidably secured to the other member when the closure moves to closed position to provide the spring counterbalance force. Yet another feature of this invention is that an intermediate portion of the spring may be fulcrumed on any one of a selected number of lobes of a cam while one end of the spring may be secured to one member and the other end slidably secured to the other member to thereby provide for adjustment of the spring counterbalance force as the leaf spring is bent relative to the lobe when the closure moves to closed position.

These and other features of this invention will be readily apparent from the following specification and drawings wherein:

FIG. 3 is a view similar to FIG. 2 with the closure in open position;

FIG. 4 is a view taken generally along the plane indicated by line 4—4 of FIG. 2;

FIG. 5 is a partial view taken generally along the plane indicated by line 5—5 of FIG. 3;

FIG. 6 is a partial view taken generally along the plane indicated by line 6—6 of FIG. 2;

FIG. 7 is a view of another embodiment of the invention with the closure in closed position;

FIG. 8 is a view similar to FIG. 7 with the closure in open position;

FIG. 9 is a view taken generally along the plane indicated by line 9—9 of FIG. 7;

Figure 1:
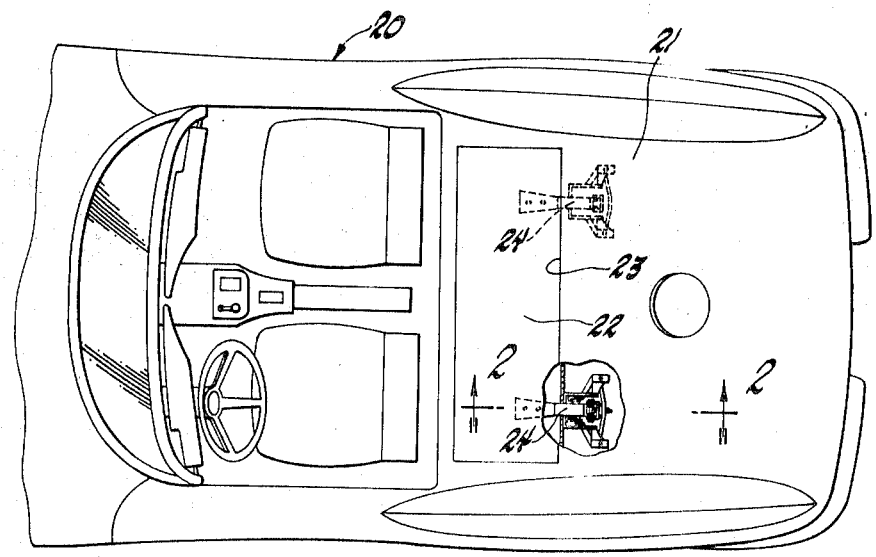
FIG. 1 is a partially broken away partial plan view of a vehicle body having a rear deck closure swingably mounted thereon and counterbalanced in open position by a counterbalance according to one embodiment of this invention.

The embodiment of the invention disclosed in FIGS. 1 through 6 inclusive is illustrated in connection with a vehicle body 20 having its rear deck body member 21 provided with a closure member 22 for a rectangular access opening 23 therein. The closure member 22 is hinged for swinging movement between an open position shown in FIG. 3 and a closed position shown in FIG. 2 by a pair of laterally spaced gooseneck type hinge arms 24. Each hinge arm 24 is hinged at one end by a hinge pin 25 to a U-shaped bracket 26 connected by suitable studs 27 to a Z-bar 210 welded to the underside of the body member 21. Each hinge arm 24 is fixed at its other end to the closure member 22 by securing screws 28 and a bracket 29 welded to the underside of the closure member 22.

A U-shaped bracket 31 is pivotally connected to the gooseneck hinge arm 24 by a transversely disposed pivot pin 32. A transversely disposed generally arch-shaped symmetrical leaf spring 33 is centrally bolted at 34 to bracket 31. Each of the hooked ends of the spring bears on a longitudinal bearing pin 35 fixed in the outer U-shaped end 36 of each of a pair of brackets 37 welded at one end to the sides of bracket 26 and bolted at the other end, FIG. 6, to lateral ears of bracket 26. A resilient noise-absorbing washer 38 is preferably provided between the central portion of the leaf spring 33 and the U-shaped bracket 31.

Figure 2:
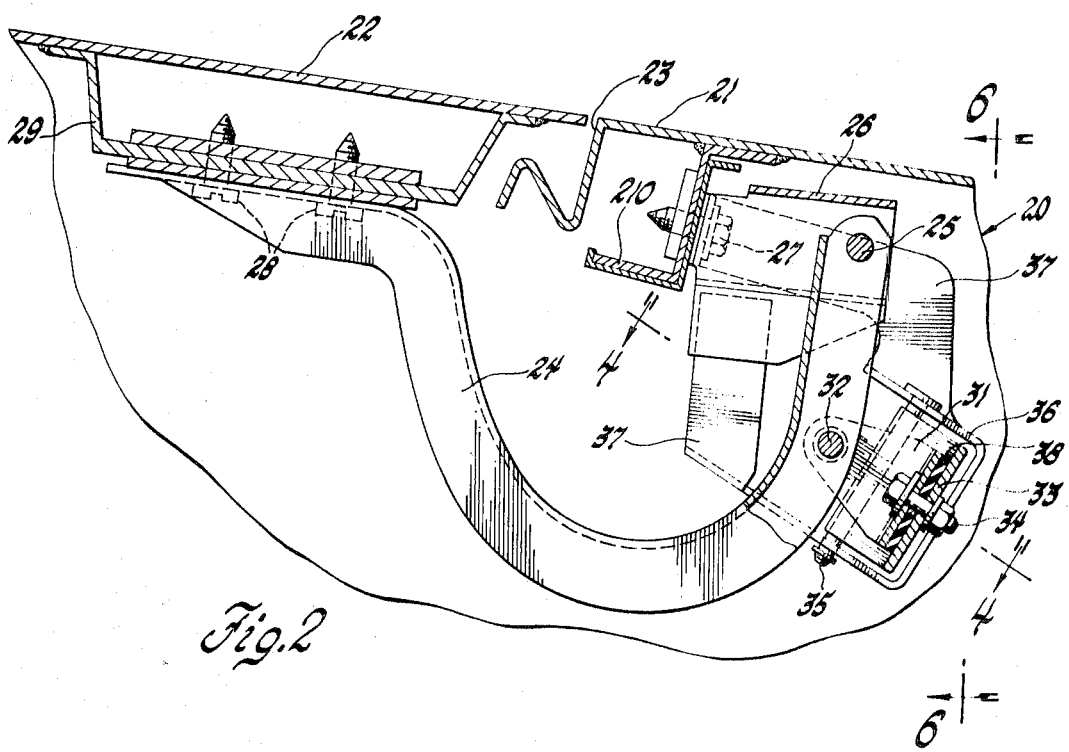
FIG. 2 is an enlarged sectional view taken generally along the plane indicated by line 2—2 of FIG. 1, with the closure in closed position.

FIGS. 2 and 4 show the position of the leaf spring 33 when the closure member 22 is in closed position, and FIGS. 3 and 5 show the position of the leaf spring 33 when the closure member 22 is in open position. Manual closing of the closure member 22 stresses the leaf spring 33 to the position thereof shown in FIG. 4, while release of a conventional locking means (not shown) of the closure member 22 permits the leaf spring 33 to return to the free position thereof shown in FIG. 5 and counterbalance the closure member 22 as it opens. It can be seen that the leaf spring 33 is in a generally free position when the closure is in open position and that movement of the closure to closed position moves the central portion of the bowed spring from one side of the pins 35 to the other side thereof to thus oppositely bow the spring so that the spring flexure provides an opening counterbalance force for the closure 22.

Referring now to the embodiment of the invention disclosed in FIGS. 7, 8 and 9, the closure member 22 is hinged to the rear deck body member 21 for swinging movement between open and closed positions by a pair of laterally spaced gooseneck type hinge arms 40. Each hinge arm 40 is hinged at one end by a hinge pin 41 to a bracket 42 welded to the underside of the body member 21. Each hinge arm 40 is bolted at 44 at its other end to a bracket 46 welded to the underside of the closure member 22 to mount the closure member on the body.

An inverted U-shaped connector 47 is pivoted at 48 to each gooseneck hinge arm 40 and a generally arch-shaped leaf spring 49 which is welded at 50 to the connector 47. A resilient washer 51 is preferably cemented to the upper face of the central portion of the leaf spring 49 as best shown in FIGS. 7 and 8. The hook-shaped ends of the leaf spring 49 bear on pins 52 extending between the sides of the U-shaped bracket 42.

FIGS. 7 and 9 show the position of the leaf spring 49 when the closure member 22 is in its closed position, and FIG. 8 shows the position of the leaf spring 49 when the closure member 22 is in its open position. Like the embodiment of the invention disclosed in FIGS. 1 through 6, inclusive, manual closing of the closure member 22 of the access opening 23 stresses the leaf spring 49 to the position thereof shown in FIGS. 7 and 9, while the release of a locking means (not shown) of the closure member 22 permits the leaf spring 49 to move to the position thereof shown in FIG. 8, to counterbalance the closure member 22 as it opens. From a comparison of FIGS. 7 and 8, it can be seen that the leaf spring 49 is generally bowed oppositely of itself in the same manner as the leaf spring 33 when the closure moves from its open position to its closed position.

Figure 10:
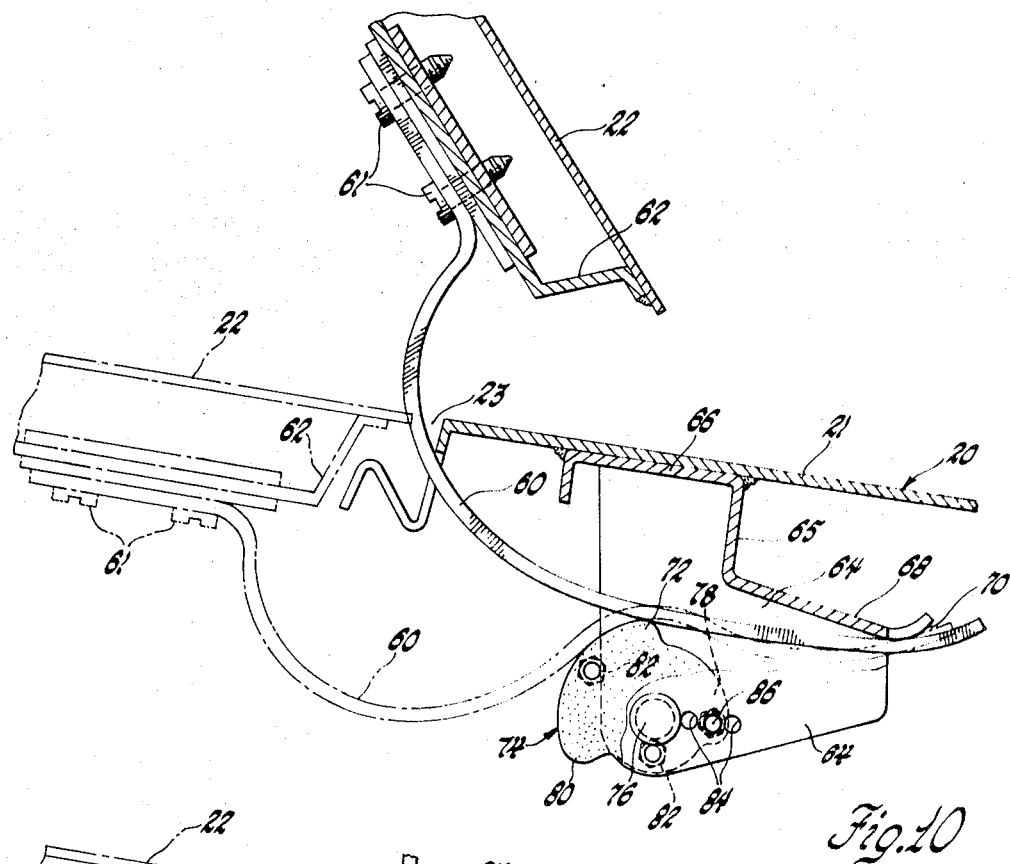
FIG. 10 is a view of another embodiment of the invention with the closure shown in full lines in open position and in phantom lines in closed position.
Figure 11:
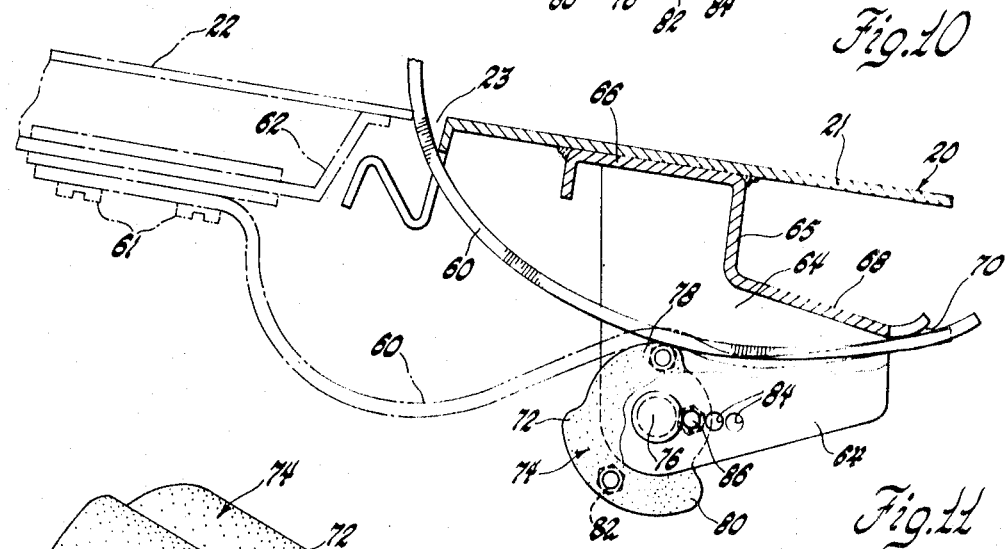
FIG. 11 is a view similar to FIG. 10 and showing another lobe of the adjustable cam in engagement with the leaf spring.
Figure 12:
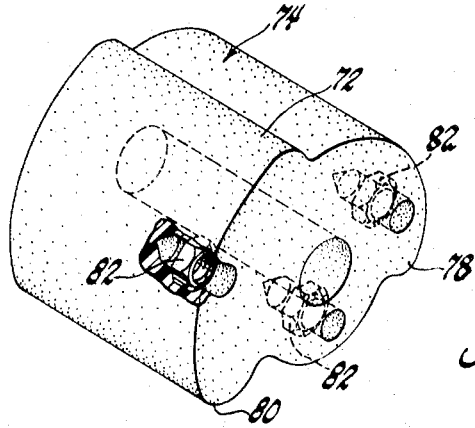
FIG. 12 is a partially broken away perspective view of the multilobed cam.

The embodiment of the invention shown in FIGS. 10, 11 and 12 is an adjustable leaf spring counterbalancing means for the closure member 22 which may be employed with any suitable hinge means (not shown) that swingably mount the closure member 22 on the vehicle body 20. This embodiment includes cam means for adjusting the biasing force of a counterbalancing leaf spring.

The adjustable counterbalancing means includes a pair of leaf spring arms 60, one of which is shown. Each leaf spring arm 60 is generally curve shaped in free position, as shown in FIG. 10, and is bolted at 61 at one end to a bracket 62 which is welded to the underside of the closure member 22. The free end of the leaf spring arm 60 extends rearwardly under the rear deck 21 of the vehicle body 20 in spaced relationship thereto, and is disposed and guided between laterally spaced depending arms 64 of an inverted U-shaped bracket 65 which is welded at its base 66 to the underside of the rear deck member 21.

The base 66 includes a strut portion 68 which terminates in an arcuate lip or skid 70 against which the upper surface of the free end of the leaf spring 60 slides when the closure member 22 is moved manually between open and closed positions.

In FIG. 10, the bottom surface of the leaf spring 60 engages a selected lobe 72 of a biasing force adjustment cam 74 journaled on a transverse bearing shaft 76 supported between the depending arms 64 of the bracket 65.

In FIG. 11, the bottom surface of the leaf spring 60 engages another selected lobe 78 of the cam 74 in a second adjusted position of the cam. While the third adjusted position of the cam 74 is not shown, the cam lobe 80 would engage the leaf spring 60 in this position. In each adjusted position of the cam 74, the biasing force of the leaf spring 60 is different.

The three lobes of cam 74 are each of different form and located a different distance from the center bore thereof through which the bearing shaft 76 extends. The cam 74 is provided with a plurality of fixed recessed nuts 82, each of which will register with only one of the cam adjustment apertures 84 in one of the arms 64 of bracket 65 when the cam is turned to locate a selected one of the three lobes thereof in position for engaging the leaf spring arm 60 intermediate the ends thereof while the free end thereof engages the skid 70.

The cam 74 is fixed in a selected adjusted position by a suitable stud 86 extending through an aperture 84. The cam 74 may be formed with more or less lobes of any shape and located various distances from the center of rotation of the cam to provide a suitable combination of bias force adjustments for any given installation.

From the foregoing description, it is believed obvious that as the closure 22 moves from its full line closed position of FIG. 10 to its phantom line position shown therein and in FIG. 11, the leaf spring 60 is bowed or flexed oppositely of its free position as it slides relative to the cam lobe which its intermediate portion engages and to the skid 70 to thereby provide an opening counterbalance force.

Thus, this invention provides an improved leaf spring counterbalance for a hinged vehicle body closure.

What is claimed is:

1. In combination with a closure member mounted on a vehicle body member for swinging movement between open and closed positions, counterbalance means for the closure member comprising, a leaf spring, means securing one portion of the leaf spring to one member, means slidably mounting spaced second portions of the leaf spring on the other member throughout swinging movement of the closure member between open and closed positions, the leaf spring being in a generally free position when the closure member is in open position, movement of the closure member to closed position displacing the one portion of the leaf spring relative to the other portions thereof as the other portions slide relative to the other member to flex the spring and provide a continual counterbalance spring force biasing the closure member to open position.

2. In combination with a closure member mounted on a vehicle body member for swinging movement between open and closed positions, counterbalance means for the closure member comprising, a leaf spring, means securing one portion of the leaf spring to the closure member, means on the body member slidably engaging spaced second portions of the leaf spring throughout swinging movement of the closure member between open and closed positions, the leaf spring being in a generally free position when the closure member is in open position, movement of the closure member to closed position displacing the one portion of the leaf spring relative to the other portions thereof as the other portions slide relative to the body member to flex the spring and provide a continual counterbalance spring force biasing the closure member to open position.

3. In combination with a closure member mounted on a vehicle body member for swinging movement between open and closed positions, counterbalance means for the closure member comprising, an elongated leaf spring, means securing an intermediate portion of the leaf spring to one member, means slidably mounting the spaced end portions of the leaf spring on the other member throughout swinging movement of the closure member between open and closed positions, the leaf spring being in a generally free position when the closure member is in open position, movement of the closure member to closed position displacing the intermediate portion of the leaf spring relative to the end portions thereof as the end portions slide relative to the other member to flex the spring and provide a continual counterbalance spring force biasing the closure member to open position.

4. In combination with a closure member mounted on a vehicle body member for swinging movement between open and closed positions, counterbalance means for the closure member comprising, a bowed leaf spring, means securing the center portion of the leaf spring to the closure member, means on the body member slidably mounting the end portions of the leaf spring throughout swinging movement of the closure member between open and closed positions, the leaf spring being in a generally free position when the closure member is in open position with the center portion located to one side of the end portions, movement of the closure member to closed position displacing the center portion of the leaf spring to the other side of the end portions as the end portions slide relative to the body member to flex the spring and provide a continual counterbalance spring force biasing the closure member to open position.

5. In combination with a closure member mounted on a vehicle body member for swinging movement between open and closed positions, counterbalance means for the closure member comprising, a bowed leaf spring, means fixedly mounting one end portion of the leaf spring on the closure member, means on the body member slidably engaging the intermediate and other end portions of the leaf spring throughout swinging movement of the closure member between open and closed positions, the leaf spring being in a generally free position when the closure member is in open position, movement of the closure member to closed position displacing the one end portion of the leaf spring relative to the intermediate and other end portions as the intermediate and other end portions slide relative to the body member to flex the spring and provide a continual counterbalance spring force biasing the closure member to open position.

References Cited
UNITED STATES PATENTS

| | | | |
|---|---|---|---|
| 1,988,137 | 1/1935 | Paul | 16—85 |
| 2,656,563 | 10/1953 | Jones | 16—190 X |
| 2,035,844 | 3/1936 | Stachow | 16—85 |
| 2,252,685 | 8/1941 | Babcock | 16—180 X |
| 2,272,230 | 2/1942 | Voorhees | 16—184 X |
| 2,740,550 | 4/1956 | Irelan | 16—180 X |
| 2,865,653 | 12/1958 | Nixon | 16—190 X |
| 3,153,260 | 10/1964 | Gionet | 16—180 X |

PAUL R. GILLIAM, Primary Examiner

U.S. Cl. X.R.

16—180